United States Patent [19]
Bonazoli et al.

[11] 3,879,703
[45] Apr. 22, 1975

[54] TILT SENSOR

[75] Inventors: Robert P. Bonazoli, Hamilton; Charles R. Janvier, Amesbury, both of Mass.

[73] Assignee: GTE Sylvania Incorporated, Salem, Mass.

[22] Filed: July 11, 1973

[21] Appl. No.: 378,156

[52] U.S. Cl. .................................. 340/25; 340/282
[51] Int. Cl. ............................................. G08g 5/00
[58] Field of Search .......... 340/25, 52 H; 317/141 R

[56] References Cited
UNITED STATES PATENTS

| | | | |
|---|---|---|---|
| 2,182,637 | 12/1939 | Marbury | 317/141 R |
| 2,429,131 | 10/1947 | Lathrop | 317/141 R |
| 3,034,097 | 5/1962 | English | 340/52 H |
| 3,701,969 | 10/1972 | Lambert | 340/25 |
| 3,772,643 | 11/1973 | Dodd | 340/52 H |

*Primary Examiner*—Thomas B. Habecker
*Attorney, Agent, or Firm*—Edward J. Coleman

[57] ABSTRACT

A sensing system for detecting predetermined angles of tilt misalignment of positionally aligned equipment without responding to low frequency vibrations. The system includes a pair of oppositely oriented, level sensing mercury switches series connected with a relay coil across a DC power supply. A capacitor is connected across the relay coil, and a resistor is series connected between the DC supply and the mercury switches, to provide a time delay relay circuit whereby the charge time via the resistor and switches for actuating relay pickup is relatively short, while discharge through the relay coil provides a relatively long delay in relay dropout.

9 Claims, 3 Drawing Figures

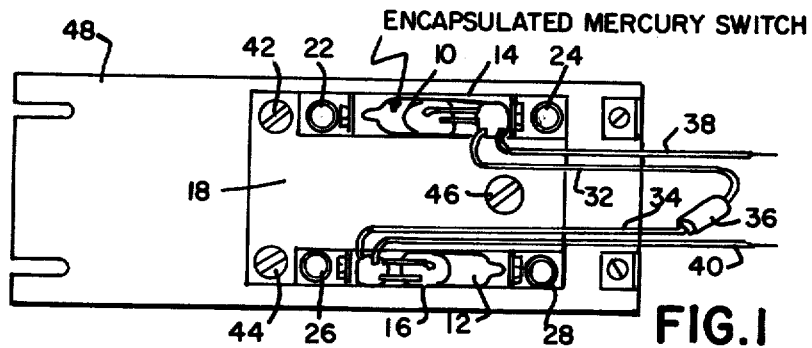
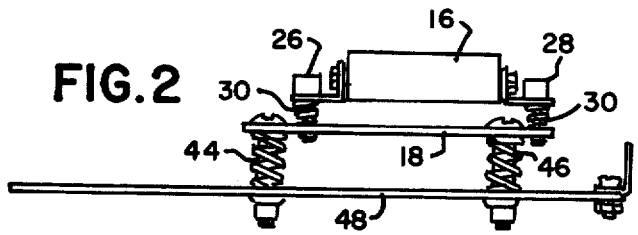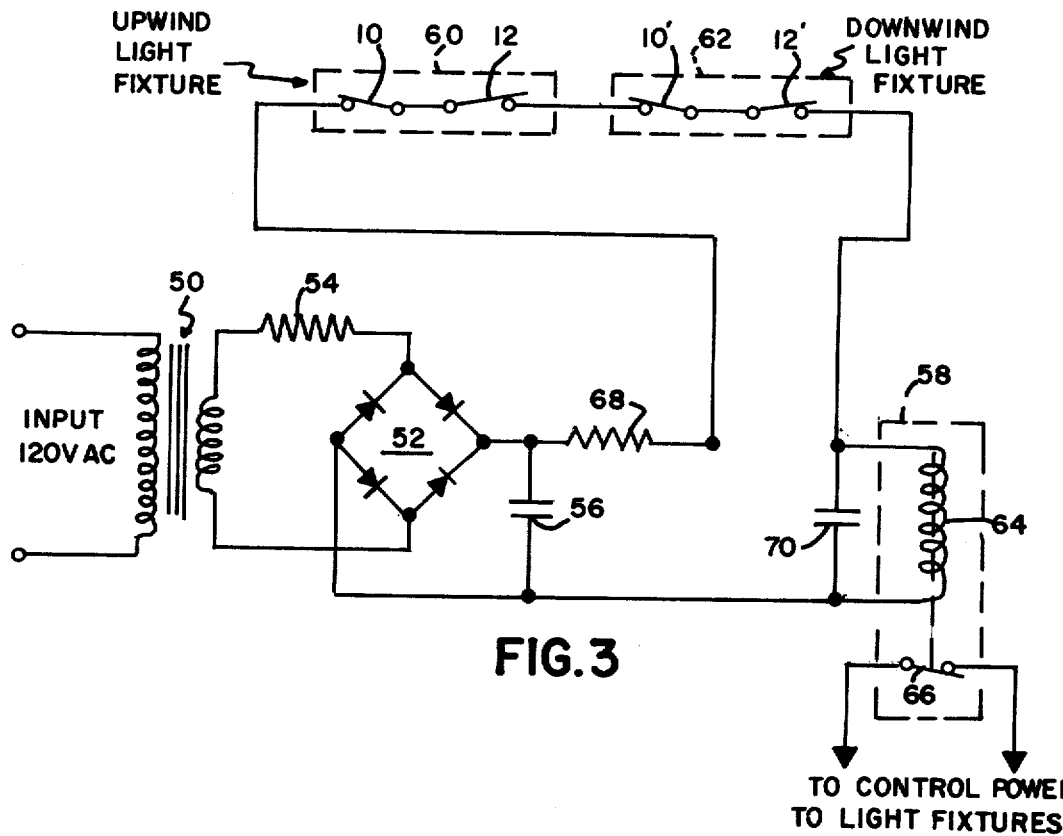

TILT SENSOR

BACKGROUND OF THE INVENTION

This invention relates to level, or tilt, sensing devices and in particular to means for detecting predetermined angles of tilt misalignment, while being substantially insensitive to low frequency vibrations, in equipment which must be maintained at a predetermined position for proper operation.

A particularly useful application of such devices is in Visual Approach Slope Indicator (VASI) equipment used on airport runways as part of an airplane landing guidance system. In such a guidance system, a pair of light fixtures are spaced apart along the side of a runway a fixed distance of, say, 300 to 500 feet and are designed to emit light beams which are pointed parallel to and are angled upwardly from the runway to define therebetween the vertical boundaries of a safe landing corridor. Such a safety corridor can be visually observed by the pilot of an approaching airplane. Each fixture is designed to cause the pilot to see differing colors depending upon his position relative to the desired approach path. For example, in a typical system the pilot will see white light from the downwind light fixture and red light from the upwind light fixture when he is in the safety corridor defined by the light beams. If the pilot is above the required approach path, both beams will be seen as white light, while a low approach path is indicated by both beams appearing red. Any transition from white to red occurs over a section of one-half degree where the light beam is pinkish in color.

Because small variations in the glide angle for landing can result in a hazardous condition, it is apparent that, if either light fixture is out of adjustment as, for example, after being hit by a snow plow, the pilot would be endangered by overshooting or under shooting the desired touchdown point. It is also apparent, however, that with the light fixtures positioned adjacent to the runway they are subject to strong vibrational forces such as caused by high winds or jet blasts from airplanes using the runway. Thus, it is essential that the lights not operate when they are permanently out of adjustment by even a small amount but are not rendered inoperative when subjected to buffeting forces causing vibrations of substantial amplitude.

One previous method employed to provide a tilt sensing in such equipment used commercially sensitive mercury switches in series with the coil of a power relay which fed power to the VASI equipment. This older system, however, would not meet the desired vibration insensitivity requirements since it would give a false signal when the mercury switch was subjected to low frequency vibration, e.g., 0.75 to 10 Hz., 0.5 inch double amplitude; the liquid mercury would move back and forth within the glass tubing and alternately make and break the electrical circuit.

Another system used for tilt sensing in an airplane landing guidance system comprises a rather heavy pendulum switch submerged in a viscous fluid to mechanically dampen low frequency vibration. The details of this system are described in U.S. Pat. No. 3,701,969. Although this pendulum tilt switch system appears to provide the desired function, it would seem to be relatively costly to manufacture and, as the pendulum cable contacts and the bearing of the universal connection supporting the pendulum are not completely sealed against dirt and corrosion, reliability seems questionable.

SUMMARY OF THE INVENTION

In view of the foregoing, it is an object of the present invention to provide an improved sensing system for detecting predetermined angles of tilt misalignment without responding to low frequency vibrations.

It is a particular object of the invention to provide a tilt sensing system with vibration insensitivity at reduced cost and improved reliability.

A further object is to provide a tilt sensing means useful for an airplane landing guidance system.

These and other objects, advantages and features are attained in accordance with the invention by a tilt sensing system comprising a level sensing switch means and a signal output means coupled to a power supply, with the operating states of the switch means controlling energization and deenergization of the signal output means, and a circuit means connected to the signal output means for delaying deenergization thereof. In a preferred embodiment, the switch means comprises a pair of encapsulated mercury switches mounted with opposite orientations for detecting both positive and negative angles of tilt misalignment. The encapsulated mercury switches are mounted on an adjusting plate with spring loaded calibration screws adjusted so that both switches are closed when the adjusting plate is level. The adjusting plate is then mounted by means of spring loaded leveling screws on a mounting plate attached to the monitored equipment.

BRIEF DESCRIPTION OF THE DRAWINGS

The invention will be more fully described hereinafter in conjunction with the accompanying drawings, in which:

FIG. 1 is a plan view of a level sensing switch assembly according to the invention;

FIG. 2 is a side view of the switch assembly of FIG. 1; and

FIG. 3 is a circuit schematic of a tilt sensing system according to the invention.

DESCRIPTION OF PREFERRED EMBODIMENT

For purposes of illustration the tilt sensing system of the invention will be described as applied in an airplane landing guidance system, such as that described hereinbefore, including a pair of light fixtures displaced relative to each other along a runway and emitting light beams pointed at preselected acute angles upwardly from and parallel to said runway to define a safe landing corridor therebetween. For example, the slope angle of the light beam from the downwind light fixture may be set at, say, 4°, and the upwind light fixture may be set with its light beam at, say, a 4.5° slope. In order to detect predetermined angles of tilt misalignment in both positive and negative directions, a pair of level sensing mercury switches are mounted on each light fixture with the switch contacts being connected in series but the switch housings being oppostively oriented with respect to each other. FIGS. 1 and 2 illustrate a preferred switch assembly. The two mercury switches 10 and 12 are encapsulated, or potted, into respective potting shells 14 and 16 having supporting brackets at both ends. For example, a Honeywell mercury switch type AS412A has been found suitable for this application, with a silicone rubber compound such as Dow Corning Sylgard No. 182 being used for potting the switch. The bracketed potting shells 14 and 16 containing the potted switches 10 and 12 are then oriented in opposite directions, as illustrated, and mounted on an adjusting plate 18 by means of respective sets of spring-loaded calibration screws 22,24 and 26,28. That is, each potting shell bracket is spaced from the adjusting plate by a compression coil spring 30 about each calibration screw. The encapsulated switches are then factory adjusted by means of the calibration screws 22-28 such that: a. both switches 10 and 12 are closed when the adjusting plate 18 is precisely level; b. switch 10 will open when the adjusting plate 18 is tilted at predetermined positive angle, say, +1°; and 3. switch 12 will open when the adjusting plate 18 is tilted at a predetermined negative angle, say, −0.5°. The calibration screws are then filled with a hardening compound, such as Glyptol 1201, to prevent further alignment.

The two switches 10 and 12 are connected in series by conductively joining the two leads 32 and 34, such as soldering, at junction 36, and the remaining switch leads 38 and 40 are connected in the electrical circuit to be described hereinafter. The adjusting plate 18 assembly is then mounted, by means of three spring-loaded leveling screws 42, 44 and 46, to a mounting plate 48, which in turn is attached to one of the light fixtures (not shown). After the light fixture is installed in the airfield and properly aimed, the adjusting plate 18 can be adjusted to a precise level position using the three leveling screws 42-46 and an accurate bubble type level.

The electrical circuit is shown schematically in FIG. 3. Transformer 50, the full wave diode bridge rectifier 52, resistor 54 and capacitor 56 are arranged to form a conventional filtered direct current (DC) power supply. The level sensing switches are then series connected with a signal output means 58 across the power supply. More specifically, switches 10 and 12 represent the two mercury switches on the upwind light fixture 60, and switches 10' and 12' represent the pair of mercury switches on the downwind light fixture 62. The signal output means comprises a relay having a coil 64 and a set of contacts 66 for enabling or disabling energization of the light fixtures 60 and 62. That is, the relay contacts are connected in the power line of the landing guidance system or to a VASI power control relay. A resistor 68, the level sensing mercury switches 10, 12, 10' and 12' and relay coil 64 are serially connected in that order across the DC supply. Accordingly, when all the level sensing switches are closed, the relay coil 64 is energized to close contacts 66 and energize the light fixtures; when one of the fixtures is tilted sufficiently to open one of the level sensing switches, the coil is deenergized to open the contacts 66 and deenergize the light fixtures 60 and 62.

In accordance with the present invention, however, circuit means is provided for delaying deenergization of the relay coil so that low frequency vibrations will not give false signals. That is, the tilt sensing system is rendered substantially insensitive to vibration of the light fixtures, such as may be caused by wind or the buffeting of jet blasts. In particular, a capacitor 70 is connected in parallel with the relay coil 64 to provide the necessary time delay characteristics in combination with the resistance of coil 64. When all level switches are closed, relay coil 64 is energized, and capacitor 70 is charged from the DC supply through resistor 68 and the serially connected level switches. This actuates the relay contacts to energize the light fixtures. Thereafter, if tilting of one of the fixtures causes actuation of one of the level sensing switches to an open circuit condition, capacitor 70 will discharge through the relay coil 64, whereby deenergization of the relay coil is delayed according to the RC time constant determined by the capacitance value $C_{70}$ of capacitor 70 and the resistance value $R_{64}$ of the relay coil 64. To render the relay substantially insensitive to low frequency vibration of the light fixtures, the resistance $R_{68}$ of resistor 68 is selected to be substantially less than the resistance $R_{64}$ of the relay coil. Accordingly, the charging time constant $R_{68} C_{70}$ is substantially less than the discharge time constant $R_{64}C_{70}$ for deenergizing the relay coil. Thus, if the mercury switch contacts are closed for only a very short period of time, the time delay circuit will be completely reset and will not "trip" until the mercury switch contacts remain open for a relatively long period. In other words, the circuit is arranged such that the relay has very little delay on pickup and a rather long delay on dropout to thereby provide a relatively inexpensive but highly reliable tilt sensing system which is insensitive to mere vibrations of the monitored equipment.

According to one typical implementation of the circuit of FIG. 3, transformer 50 provides 24 volts across the secondary; the filter circuit resistor 54 is 200 ohms, 2 watts, and the filter capacitor 56 is 100 MFD, 50VDC. Delay capacitor 70 has a capacitance of 1,100 MFD and a rating of 50 VDC. The charging resistor 68 is a 2 watt device having a value of 100 ohms, and relay 58 is rated at 24 VDC, having 3 amp contacts and a coil 64 resistance of 650 ohms. The $R_{68}C_{70}$ charge time is 0.01 second and the $R_{64}C_{70}$ discharge time is 0.7 seconds. Of course, since there is typically a residual delay in relay dropout subsequent to coil deenergization, the effective time from start of discharge to relay dropout is actually about twice the calculated discharge time. With this arrangement, it has been determined that the circuit through the tilt switches need only remain periodically closed for 1 percent to 2 percent of the time in order to maintain the relay energized. This condition is generally wet when the tilt switches are exposed to low frequency random vibrations.

Although the invention has been described with respect to specific embodiments, it will be appreciated that modifications and changes may be made by those skilled in the art without departing from the true spirit and scope of the invention. For example, this tilt sensing system is not limited to use with VASI equipment, and any number of level sensing switches, which can be other than a mercury type, may be used. Clearly, other specific DC power supply designs may be employed and the signal output means may comprise a circuit or device other than a relay. Further, deenergization delay means other than the specific RC arrangement illustrated may be employed.

What we claim is:

1. A sensing system for detecting predetermined angles of tilt misalignment of positionally aligned equipment, said system comprising, in combination:
    a power supply;
    a pair of series connected mercury switches coupled to said power supply and mounted on said equipment with opposite tilt sensing orientations, for detecting both positive and negative angles of tilt misalignment;

signal output means series connected with said pair of mercury switches across said power supply and operative to be energized by said power supply when said mercury switches are in a normally closed circuit condition and to be deenergized when one of said mercury switches is in an open circuit condition, which occurs in response to a predetermined tilt misalignment of said equipment;

and electrical circuit means connected to said signal output means for time delaying deenergization thereof, whereby said system is substantially insensitive to vibration of said equipment.

2. A sensing system according to claim 1 wherein said signal output means comprises a relay having contacts and a coil, said relay coil being series connected with said switch means across said power supply.

3. A sensing system according to claim 2 wherein said delay circuit means comprises a capacitor connected across said relay coil, said capacitor being charged through said switch means during energization of said relay coil and being discharged through said relay coil upon deenergization of said relay in response to actuation of said switch means to an open circuit condition, whereupon the RC time constant for delaying relay deenergization is substantially determined by the capacitance value of said capacitor and the resistance of said relay coil.

4. A sensing system according to claim 3 wherein said power supply is a direct current supply, and further including a resistor series connected between said direct current power supply and said switch means for substantially determining the charge time of said capacitor, the resistance of said resistor being substantially less than the resistance of said relay coil, whereby the charge time for energizing said relay coil is substantially less than the discharge time for deenergizing said relay coil.

5. A sensing system for detecting predetermined angles of tilt misalignment of positionally aligned equipment, said system comprising, in combination:

a power supply;

level sensing switch means comprising a pair of series connected mercury switches coupled to said power supply and mounted on said equipment with opposite tilt sensing orientations, for detecting both positive and negative angles of tilt misalignment;

signal output means coupled to both said power supply and said switch means and operative to be energized by said power supply when said switch means is in a first operating state, which is the normal condition, and to be deenergized when said switch means is in a second operating state, which occurs in response to a predetermined tilt misalignment of said equipment;

and electrical circuit means connected to said signal output means for time delaying said deenergization thereof, whereby said system is substantially insensitive to vibration of said equipment.

6. A sensing system according to claim 5 wherein said switch means further includes an adjusting plate, and a pair of bracketed potting shells mounted on said adjusting plate by respective sets of spring loaded calibration screws, each of said mercury switches being encapsulated into a respective one of said potting shells, and said encapsulated switches being adjustable by means of said calibration screws so that both switches are closed when said adjusting plate is level.

7. A sensing system according to claim 6 wherein said switch means further includes a mounting plate attached to said equipment, and said adjusting plate is mounted on said mounting plate by a set of spring loaded leveling screws, said adjusting plate being adjustable to a level position by means of said leveling screws.

8. For use in an airplane landing guidance system including a pair of light fixtures displaced relative to each other along a runway and emitting light beams pointed at preselected acute angles upwardly from and parallel to said runway to define a safe landing corridor therebetween, tilt sensing means associated with each of said light fixtures for disabling said system when either of said light beams deviates by a predetermined amount from the preselected acute angle therefor, said tilt sensing means comprising:

a direct current power supply;

a plurality of series connected normally closed mercury switches mounted on each of said light fixtures for detecting both positive and negative angles of tilt misalignment;

a relay having a coil and a set of contacts for enabling or disabling energization of said light fixtures, said relay coil and said plurality of mercury switches being series connected across said power supply;

and a capacitor connected across said relay coil, said capacitor being charged through said mercury switches during energization of said relay coil, whereupon said relay contacts are actuated for enabling energization of said light fixtures, and said capacitor being discharged through said relay coil, upon actuation of one of said mercury switches to an open circuit condition, whereby deenergization of said relay coil is delayed according to the RC time constant determined by the capacitance value of said capacitor and the resistance value of said relay coil so as to render said relay substantially insensitive to vibration of said light fixtures.

9. Sensing means according to claim 8 further including a resistor series connected between said direct current power supply and said switch means for substantially determining the charge time of said capacitor, the resistance of said resistor being substantially less than the resistance of said relay coil, whereby the charge time for energizing said relay coil is substantially less than the discharge time for deenergizing said relay coil.

* * * * *